United States Patent
Newton et al.

(10) Patent No.: US 7,595,755 B2
(45) Date of Patent: Sep. 29, 2009

(54) DISTANCE ESTIMATION

(75) Inventors: Timothy Newton, Cambridge (GB);
James Collier, Cambridge (GB);
Candido Levita, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 608 days.

(21) Appl. No.: 11/161,738

(22) Filed: Aug. 15, 2005

(65) Prior Publication Data
US 2006/0154611 A1    Jul. 13, 2006

Related U.S. Application Data

(63) Continuation of application No. PCT/GB2004/000630, filed on Feb. 18, 2004.

(51) Int. Cl.
*G01S 13/10* (2006.01)

(52) U.S. Cl. ...................... 342/458; 342/127

(58) Field of Classification Search ................ 342/109, 342/112, 127, 442, 458, 463; 455/67.16
See application file for complete search history.

(56) References Cited

U.S. PATENT DOCUMENTS

| | | | |
|---|---|---|---|
| 5,949,828 A * | 9/1999 | Izumi | 375/326 |
| 6,862,297 B1 * | 3/2005 | Gardner et al. | 370/503 |
| 7,228,228 B2 * | 6/2007 | Bartlett et al. | 701/207 |

* cited by examiner

*Primary Examiner*—Dao L Phan
(74) *Attorney, Agent, or Firm*—Novak Druce DeLuca + Quigg LLP (57) ABSTRACT

A method for estimating the distance between a transmitter and a receiver, the transmitter being arranged to transmit a signal as a series of bursts, and the carrier frequency of each burst being set according to a predetermined sequence, the method comprising: forming a first series comprising the measured differences between the phases of successive bursts as received at the receiver; forming a second series comprising estimated differences between the phases of successive bursts as received at a supposed time difference between the transmitter and the receiver; and determining the quality of fit between the first series and the second series.

14 Claims, 6 Drawing Sheets

DISTANCE ESTIMATION

CROSS-REFERENCE TO RELATED APPLICATIONS

The present application is a National Stage filing under 35 371 of International Application No. PCT/GB2004/000630 filed 18 Feb. 2004 which claims priority to GB Application No. 0303705.8 filed 18 Feb. 2003; the entire disclosures of which are incorporated herein by reference.

TECHNICAL FIELD

This invention relates to estimating the distance between two wireless stations.

BACKGROUND OF INVENTION

In many situations it is useful to estimate the distance between two wireless stations. For example, if one of the wireless stations is a mobile user terminal which can communicate with several fixed base stations then it may be useful to be able to estimate the distance of the user terminal from each of the fixed base stations and thereby determine its location. In another situation, one of the wireless terminals may be located at a vending machine that can perform financial transactions via a user terminal. In that situation it may be desirable for the vending machine to estimate the distance between it and the user's terminal and to accept transactions only from a user who is within some short distance, perhaps 3 m.

It is not feasible simply to use received signal strength to estimate the distance between the stations, since the output power of the transmitter, the antenna gains, the propagation conditions and the receiver sensitivity can all vary so much that distances derived from received signal strength indications (RSSI) can be out by a factor of 10.

Another method for determining the distance is to measure the time taken for signals to travel between the two stations. This requires highly accurate synchronisation between the stations and highly accurate timing systems, especially if relatively short distances such as a few meters are to be measured.

SUMMARY OF INVENTION

According to the present invention there is provided a method for estimating the distance between a transmitter and a receiver, the transmitter being arranged to transmit a signal as a series of bursts, and the carrier frequency of each burst being set according to a predetermined sequence, the method comprising: forming a first series comprising the measured differences between the phases of successive bursts as received at the receiver; forming a second series comprising estimated differences between the phases of successive bursts as received at a supposed time difference between the transmitter and the receiver; and determining the quality of fit between the first series and the second series.

The method suitably comprises: forming a plurality of second series each comprising estimated differences between the phases of successive bursts as received at a respective supposed time difference between the transmitter and the receiver; determining the qualities of fit between the first series and each of the second series; and adopting the supposed difference corresponding to the second series having the highest quality of fit to the first series as an estimate of the time difference between the transmitter and the receiver. This may preferably be used to form an initial estimate of the time difference. The supposed time differences from the transmitter preferably span a range between predetermined maximum and minimum distances between the transmitter and the receiver plus the maximum time difference between the transmit and receive reference clocks. The method may comprise the step of determining the maximum and minimum distances. Preferably the maximum distance is not less than the maximum range for communication between the transmitter and the receiver. In this aspect of the method preferably there are at least 20, and most preferably at least 50 second series.

The method suitably comprises: forming a first one of the second series comprising estimated differences between the phases of successive bursts as received at a current estimate of the time difference between the transmitter and the receiver; determining a second estimate of the time difference from the transmitter perturbed from the current estimate of the time difference between the transmitter and the receiver; and forming a second one of the second series comprising estimated differences between the phases of successive bursts as received at the second estimate of the time difference between the transmitter and the receiver. The second estimate could be perturbed randomly from the current estimate, or perturbed by one of a number of set positive and negative amounts, or perturbed in another way. In this aspect of the method, an initial current estimate of the time difference may be formed by determining the best fit from a set of second values for time differences spanning the available range, as described above. Then the method may proceed by applying perturbations to that estimate to evolve the estimate over time.

A prior probability estimate representing estimated probabilities for each of a range of time differences from the transmitter may be used to facilitate selection between a plurality of second series. Each second series corresponds to a time difference from the transmitter. The quality of fit between second series and the first series may be weighted by the prior probability estimate for the time difference corresponding to that second series. Then the time difference of the second series having the highest such weighted quality of fit may be adopted as the current time difference estimate, or the quality of fit for that second series may be compared with the quality of fit for a series corresponding to the current time difference estimate. If the quality of fit for that second series is better than that for the current time difference estimate then the time difference corresponding to that second series is adopted as the current time difference estimate. The method may comprise forming an estimate of the probability that the time difference between the transmitter and the receiver will have each of a plurality of values, weighting the quality of fit between the first series and at least some of the second series in accordance with the estimated probability corresponding to the time difference corresponding to the respective second estimate, and comparing the weighted qualities of fit. Preferably the current time difference estimate is determined as a result of that comparison.

The step of forming the first series preferably comprises processing the signal received at the receiver to servo the final intermediate receiver frequency to zero. Most preferably the step of forming the first series comprises processing the signal received at the receiver to servo the final intermediate receiver frequency to zero from a final non-zero intermediate receiver frequency. The servoing of the final intermediate receiver frequency may conveniently be performed digitally.

The measured differences between the phases of successive bursts are preferably determined based on the phases of the bursts as measured at the end of each burst.

Each series preferably comprises more than 30 values of phase difference. Each series preferably comprises fewer than 80 values of phase difference. Most preferably the number of values in each series is in the range from 40 to 60. These numbers are especially suitable for Bluetooth and like systems. Other numbers could be used in conjunction with other systems.

The transmitter and the receiver are preferably operable according to a frequency hopping spread-spectrum scheme, such as Bluetooth. The transmitter may modulate the signal for the purpose of data exchange/transfer, suitably by transmitting data in the bursts. The transmitted signal may be modulated with data to be transmitted from the transmitter to the receiver.

The method is preferably performed at the receiver. According to a second aspect of the present invention there is provided a receiver arranged to perform a method as set out above.

BRIEF DESCRIPTION OF DRAWING FIGURES

The present invention will now be described by way of example with reference to the accompanying drawings, in which.

DETAILED DESCRIPTION

The present system will be described with reference to a Bluetooth wireless radio system, but it is not limited to use in such a system.

Bluetooth is a frequency hopping spread-spectrum (FHSS) system. Data is transmitted in a series of short bursts (packets). The radio carrier frequency for each burst is determined according to a pseudo-random sequence with the effect that the carrier frequency hops from one frequency to the next as successive bursts are transmitted. Since the receiver has knowledge of the sequence it can receive and decode each burst.

The propagation of radio signals between the transmitter and receiver will first be discussed.

Let the signal $S_e$ emitted by a first terminal (transmitter) be:

$$S_e = \cos(\omega t) \quad (1)$$

where $\omega$ is the carrier angular frequency and $t$ is time. Then assuming an unobstructed signal path between the first and second terminals the corresponding signal $S_r$ as received at a second terminal (receiver) can be expressed as:

$$S_r = \cos(\omega.(t - x/c + \delta t) + \phi(\omega)) \quad (2)$$

where $x$ is the distance between the receiver and transmitter, $c$ is the speed of light, $\phi(\omega)$ is the phase shift in the receiver due to RF filters and $\delta t$ is the time difference between the reference clocks of the two stations. $\phi(\omega)$ is in principle a function of frequency.

At a radio receiver the received signal can be mixed down to an intermediate frequency, or to a complex baseband (sometimes known as zero IF). Either of these two approaches results in a signal that can be processed in a manner that makes the final frequency exactly zero (for instance by averaging the instantaneous frequency over a time that is long compared to the modulation rate, and using this signal as an input to the demodulation process).

In a FHSS system, if a first burst transmitted is made at a frequency $\omega_1$ and then a second burst is transmitted at frequency $\omega_2$ then from equation (2) the phase of the corresponding received signals can be expressed as:

$$\text{phase of first transmission as received} = \omega_1.(x/c + \delta t) + \phi(\omega_1) \quad (3)$$

$$\text{phase of second transmission as received} = \omega_2.(x/c + \delta t) + \phi(\omega_2) \quad (4)$$

assuming the differences in frequency between the transmitter and the receiver have been cancelled, e.g. as described above. These can be subtracted to give $\Delta\phi$, the difference in phase between signals $\omega_1$ and $\omega_2$ as received:

$$\Delta\phi = (\Omega_1 - \Omega_2).(x/c + \delta t) + \phi(\omega_1) - (\omega_2) \quad (5)$$

If this relationship is to be used for estimating the distance between the transmitting and receiving stations, the unknowns are:

x: the desired output from the estimation, $\delta t$: the time difference between the reference clocks of the two stations; and $\phi(\omega_1)$ and $\phi(\omega_2)$: the differences in phases from the receiver filter.

Figure 1:
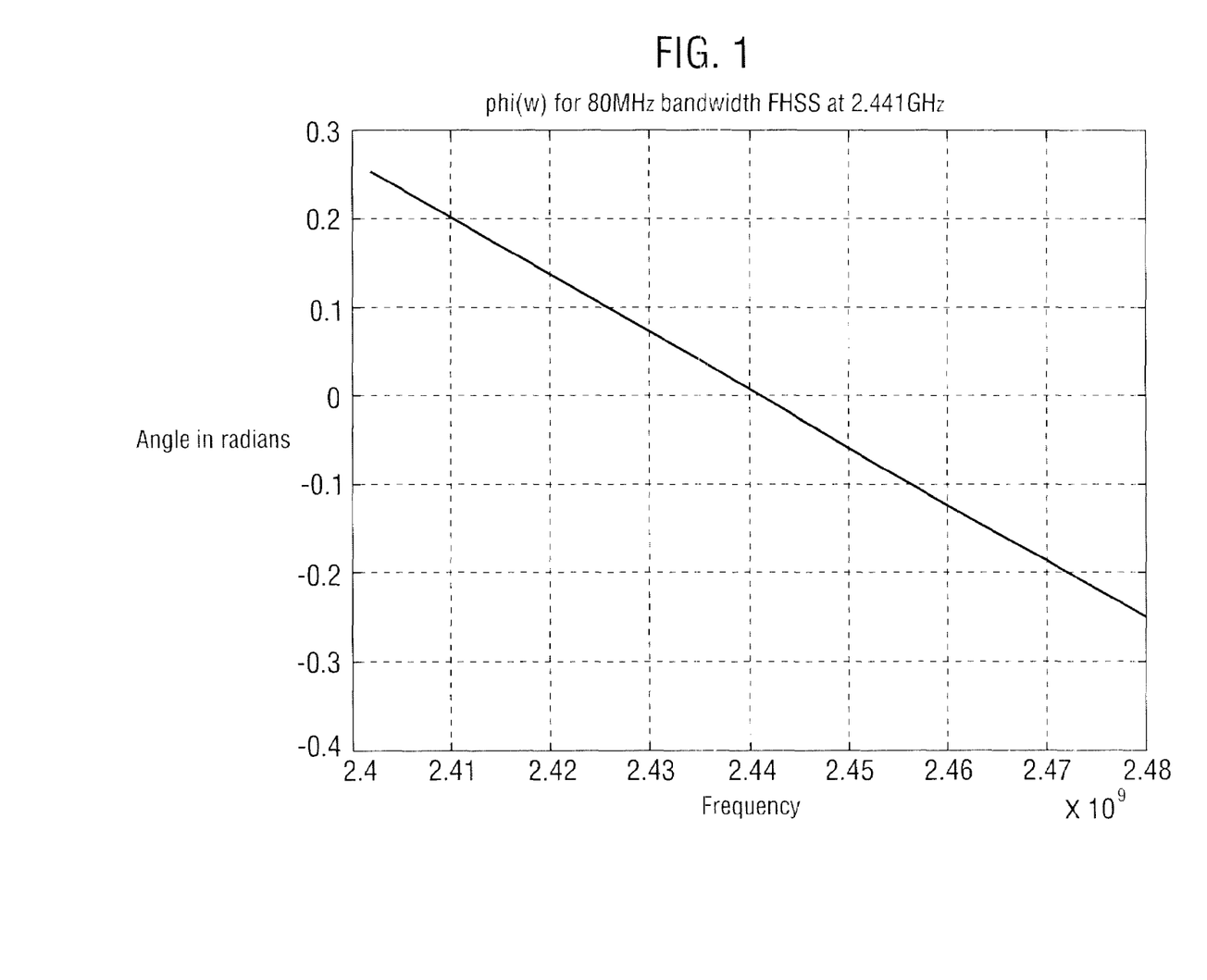
FIG. 1 is a graph showing the change of phase across the 80 MHz band of a typical Bluetooth receiver due to a typical integrated filter.

Considering the last of these unknowns first; in a receiver design that has little or no frequency selectivity in front of the mixer (which is normally the case with receivers implemented within integrated circuits), this error can be assumed to be small. For illustration, FIG. 1 is a graph showing the change of phase across the 80 MHz band of a typical Bluetooth receiver with a typical integrated filter. Considering the phase shift from an 80 MHz frequency step at a distance of 1 m:

$$\omega.x/c = 2*pi*80 \times 10^6 / 3 \times 10^8 = 1.7 \text{ radians}$$

so the effect of $\phi(\omega)$ is only a (constant) error of $0.5/1.7 = 0.3$ m. For receivers in which the error due to differences in phase from the receiver filter is not negligible, such error is likely to be a constant characteristic of a receiver, and so can be calibrated out.

If $\phi(\omega_1) - \phi(\omega_2)$ is taken as being zero then the remaining unknown other than x is $\delta t$: the unknown time difference between the reference clocks. This can be eliminated by exchange of information between the two stations. For example, if each station were to estimate x ignoring the time difference between the reference clocks then the distance between the stations would be estimated as pseudo distance $(x + c.\delta t)$ by one station, and pseudo distance $(x - c.\delta t)$ by the other station. So long as the two stations are able to exchange these measurements, either can calculate the actual distance x by averaging the two modulo the maximum clock uncertainty.

Figure 2:
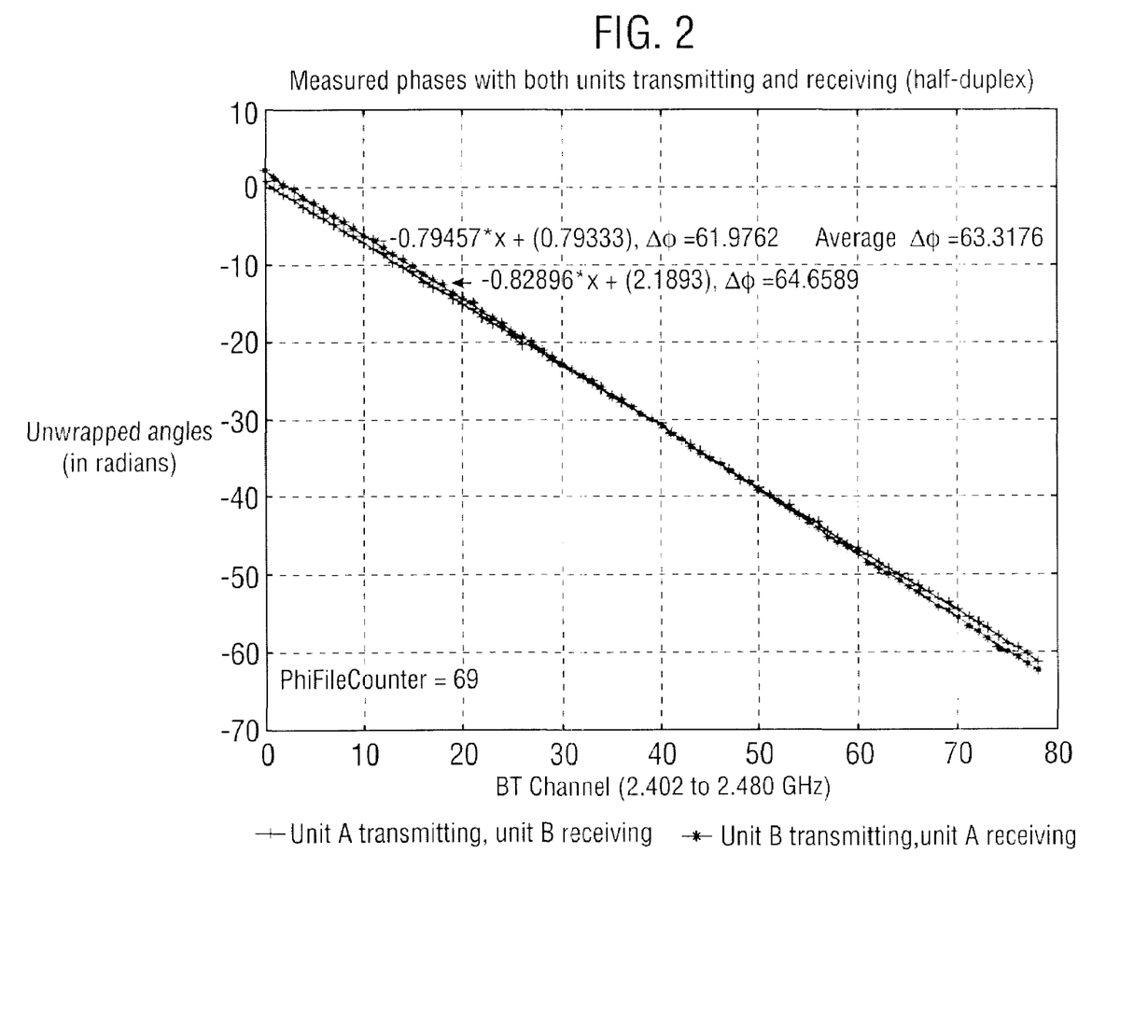
FIG. 2 is a plot of measured phase against channel for an experimental system.

FIG. 2 shows the results of a practical measurement of phase (Y axis) at a range of carrier frequencies (X axis) for signals over a coaxial cable of length 25 m between two phase-locked and commonly clocked transceivers. The results demonstrate that the measured phase is essentially linearly dependent on the carrier frequency.

The above method appears simple, but there are a number of additional problems that need to be overcome in order to provide a fully reliable distance estimate:

The transmitter and receiver must both preserve phase relative to their reference clock while hopping. This is typically the case if both use phase-locked-loops (PLLs) in their design.

There is likely to be a frequency error between the transmitter and receiver due to clock errors between the transmitter and receiver.

The phase jump between bursts may be much greater than 2 pi radians (at 1.7 radians per meter it would be 85 radians at 50 m, for instance), and thus the received phase is ambiguous, it only being possible to determine it modulo (2 pi).

One way to tackle problem 1 is by the use of an appropriate PLL architecture, whereby the transmitted signal is phase locked to a reference clock which is kept running even while the unit is not transmitting. The receiver does the same, keeping the reference for the PLL running continuously. This architecture is common.

Problems 2 and 3 are more difficult to tackle, but can be tackled simultaneously by the measurement of phase differences between successive hops.

If the samples are taken at equally spaced times then when the phase differences between them are calculated the frequency errors are cancelled out. This addresses problem 2.

Regarding problem 3, it is generally a property of FHSS systems that the distribution of the hops between the frequencies of successive transmissions is known. Typically the hops are of evenly distributed size; sometimes a big jump, sometimes a small jump, in a pseudo random fashion. This means that even if the distance between the transmitter and the receiver is relatively large, the pattern of phase shifts, despite being constrained to lie within plus-or-minus pi due to the modulo (2 pi) effect inherent to the measurement of phase, is quite characteristic of the distance. This property can be used to address problem 3.

Since the receiver has knowledge of the sequence of frequencies to be used by the transmitter, the receiver can predict the differences in phase between successive received bursts if it knows its time difference from the transmitter, i.e.:

$$\omega_1.(x/c+\delta t)+\phi(\omega_1)$$

Figure 3:
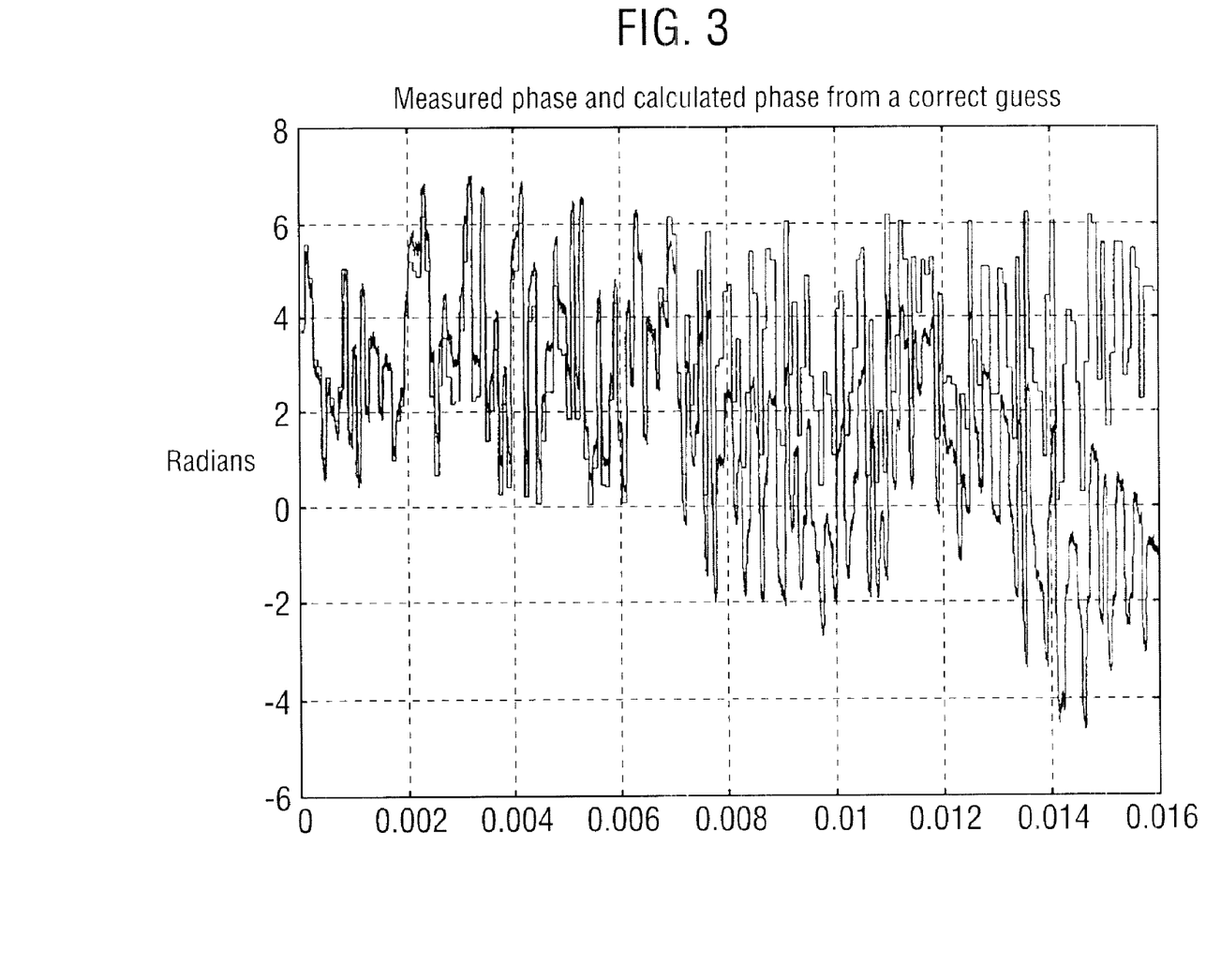
FIG. 3 is a graph showing measured phase and a calculated phase trajectory.

One way to make use of this property in order to estimate the actual time difference between transmitter and receiver is for the receiver to make a guess as to what this time difference might be, and then to calculate the pattern of phase shifts that would be seen by the receiver if the actual time difference were equal to the guess. The pattern can be calculated over some time into the past; it has been found that typically calculating the pattern of shifts over 50 hops is adequate. Then it can compare the pattern of difference between successive phase calculations with the received pattern to assess the accuracy of its guess of the time difference between the transmitter and receiver. A pseudo distance between the transmitter and receiver can be estimated from the time difference, by multiplying the time difference by the speed of the signals (for radio signals, the speed of light). It is a pseudo distance because it does not yet correct for the clock phase difference, $\delta t$ To illustrate this, FIG. 3 shows a measured phase trajectory over a period of 0.016 seconds and a calculated phase trajectory for the same period based on a guess of the time difference between the transmitter and the receiver. In this case the fit between the pattern of differences in each curve between the frequencies at successive bursts is relatively good, indicating that the guess is a relatively accurate one.

The curve in FIG. 3 for the calculated signal has a single value for each received packet. The curve for the actual received signal shows an evolution of the value of the estimated phase during each packet. For this reason the signal processing to determine the quality of the fit between the differences preferably compares the calculated phase differences with the measured phase differences based on the phase as measured at the end of each packet. It should also be emphasized that it is not the calculated and measured phases for each packet that are compared, but the calculated and measured differences in phase between successive packets between $-\pi$ and $+\pi$.

A metric for the goodness of fit between the calculated and measured curves can be derived by simple summation of the square of the differences between the measured phase jumps and the calculated phase jumps.

Figure 4:
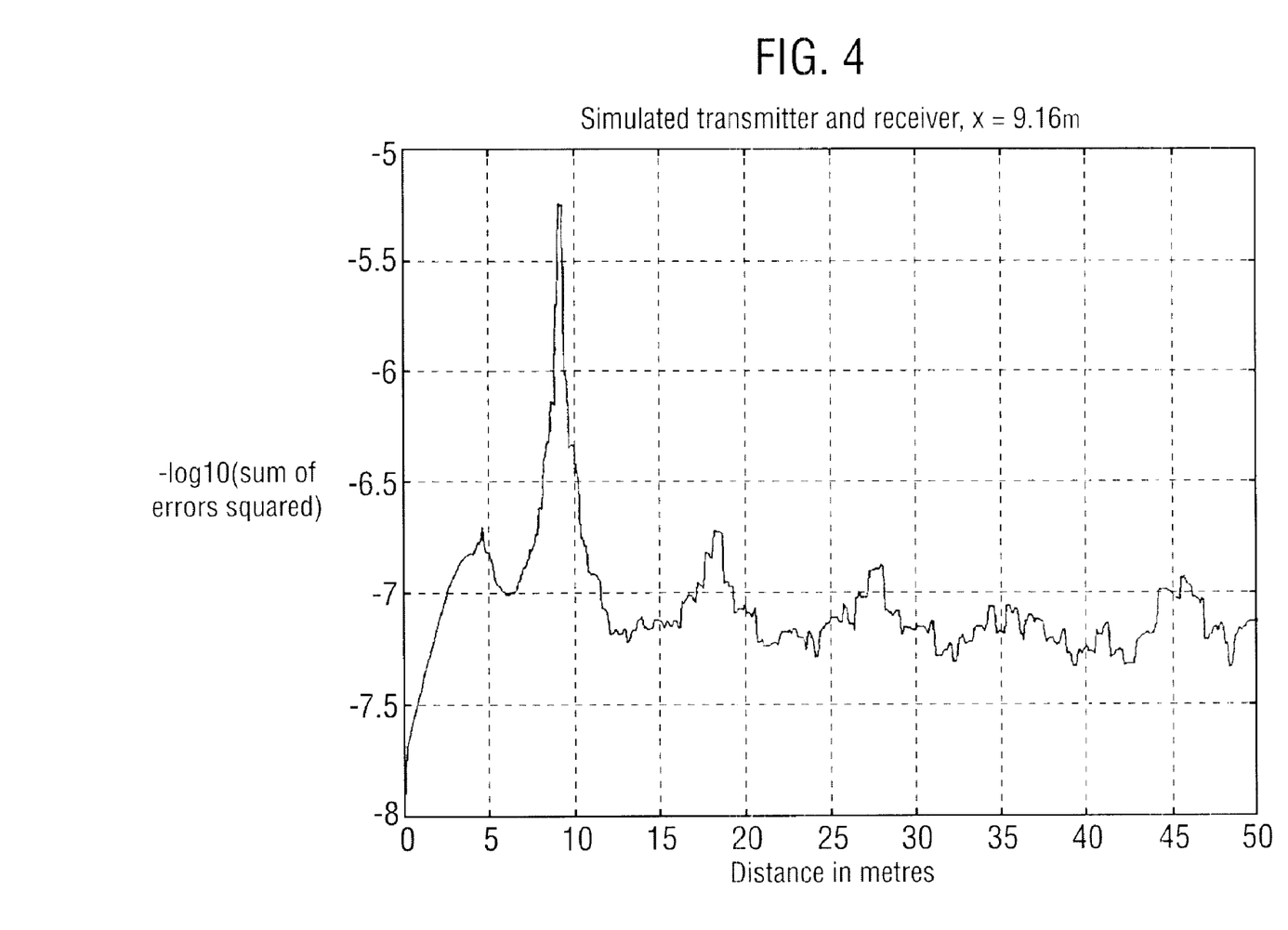
FIG. 4 is a graph showing the results of a simulation for the estimation of distance.

To determine the distance between the transmitter and the receiver the receiver can make a series of guesses of the time difference in the range at which the distance can lie—for a low-power RF system such as Bluetooth this may, for example be guesses at 10 cm steps between zero and 50 m, and differences in clock of up to 1 microsecond. For each guess the set of phase differences over the last 50 hops is calculated and compared with the measured values to determine the quality of fit between them. FIG. 4 shows an example of the results of this. FIG. 4 shows the results of a simulation, with the quality of fit plotted against distance. The pseudo distance between the transmitter and receiver is taken to be that at which this curve has it maximum: in this example, approximately 9 meters. This simulation includes the degradation that one would get from a practical transmitter and receiver ('phase noise') as well as the additive noise inevitable in a real receiver, demonstrating that the technique is robust in practice.

It would be possible but onerous to perform the above calculations for a series of guesses each time that an estimation of distance is needed. However, in practice a better method is to use a Monte-Carlo technique. Once an estimate of time difference has been made by scanning a series of guesses as described above, this estimate can be kept up-to-date continuously by making random perturbations to the current estimate of time difference, and comparing the quality of fit between the measured phase differences and: a. the phase differences calculated for the current time difference estimate, and b. the phase differences calculated for the perturbed current time difference estimate. The perturbed current time difference estimate is adopted as the new value of the current time difference estimate if its fit is better. Otherwise the current time difference estimate is left unchanged. Conveniently, one guess can be made each hop. Two or more guesses may be made and tested each hop.

A further refinement is to apply a prior probability distribution to the error vector, i.e. using Bayes' law, so as to weight the quality of fit of each guess in accordance with that error vector so as to determine which is the best estimate.

Conveniently the receiver stores a set of historic phase measurements for comparison with subsequent calculations. As indicated above, around 50 measurements have been found to be adequate, but more or fewer could be used. As each new phase measurement is available from a newly received packet, the oldest stored value is dropped from the store. This keeps the processing load bound and convenient in a low cost microcontroller or DSP such as is employed in a cellular phone or Bluetooth IC.

The invention described above is particularly suited to Frequency Hopping Spread Spectrum (FHSS) communications such as Bluetooth, in which it has been found to give accuracies of order 10 cm over 50 m range, but can in principle be applied to any wireless communications system which uses a multiplicity of carrier frequencies in a sequence.

Figure 5:
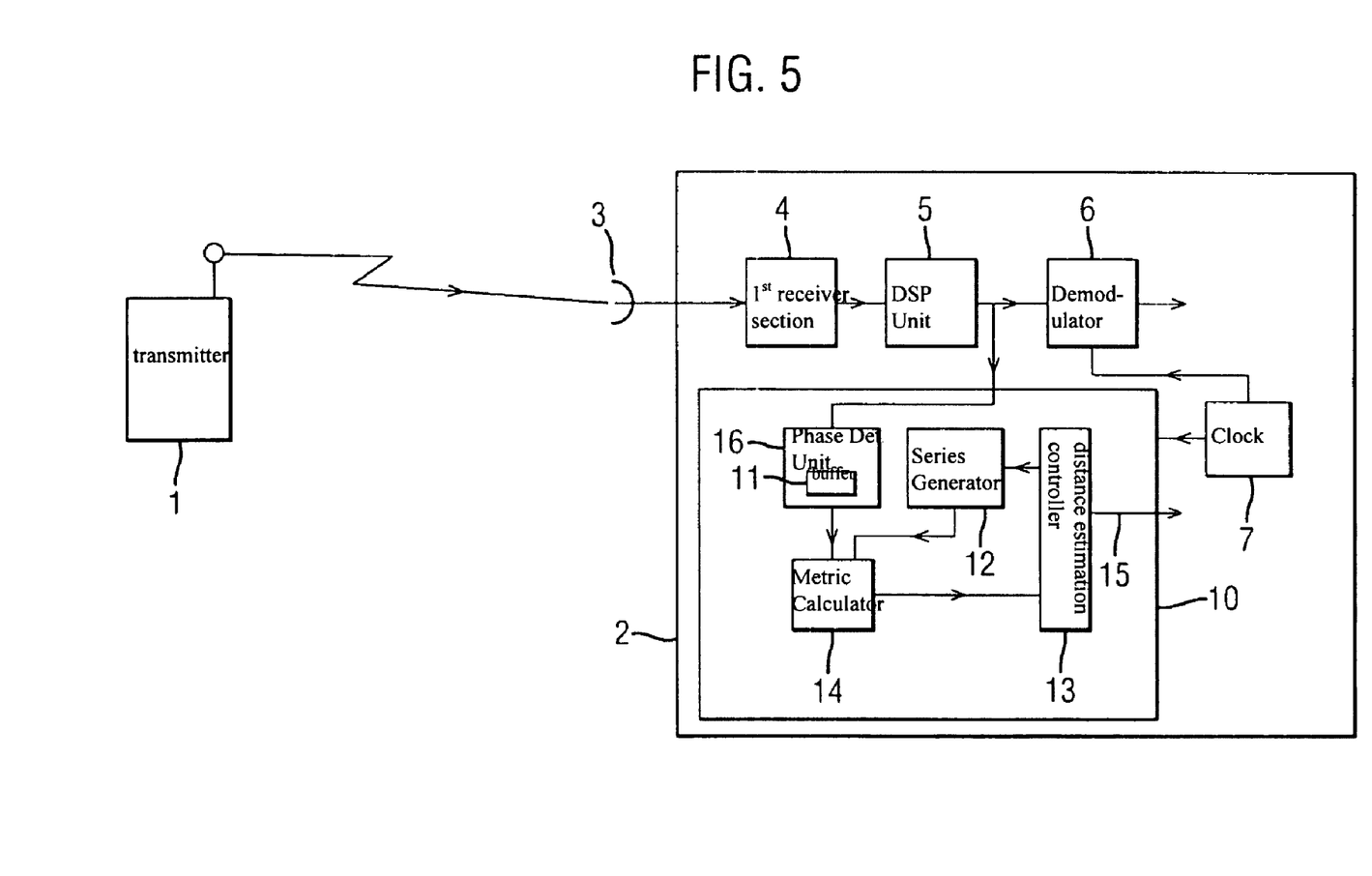
FIG. 5 is a schematic diagram of a pair of wireless terminals.

FIG. 5 shows a system in which the present system may be employed. The system comprises a transmitter 1 and a receiver 2. The transmitter transmits a FHSS radio signal to the receiver. At the receiver the signal is received at antenna 3 and processed down to a non-zero intermediate frequency by a first receiver section 4. Subsequently the non-zero IF signal is servoed to zero IF by a digital signal processing unit 5. This may conveniently be done by averaging the instantaneous frequency from the first receiver section 4 over a time that is long compared to the modulation rate. The output of the processing unit 5 is passed to a demodulator 6 which demodulates the signal for further use in the receiver.

The receiver also comprises a distance estimation unit 10 for estimating the distance between the receiver and the transmitter. The distance estimation unit is most conveniently implemented by means of software on a signal processing integrated circuit, although it could be implemented in dedicated hardware or a combination of the two. In the distance estimation unit there is a phase determination unit 16 for determining the phase of the signal received from the processing unit 5 relative to a clock 7 of the receiver. This forms a series of phase measurements, one for each received burst, which are stored in buffer 11. The buffer 11 conveniently stores the last 50 measurements. The distance estimation unit also includes a series generator 12 which generates series of calculated phase estimates for supposed transmitter/receiver distances supplied to it by distance estimation controller 13, and a metric calculator 14 which compares series stored in buffer 11 and generated by series generator 12 to determine the quality of the fit between them. In use the distance estimation controller supplies the series generator 12 with supposed values of the transmitter/receiver distance, and based on the output of the comparator 14 forms an estimate of the transmitter/receiver distance as described above. This estimate is made available to the rest of the receiver at output 15.

Figure 6:
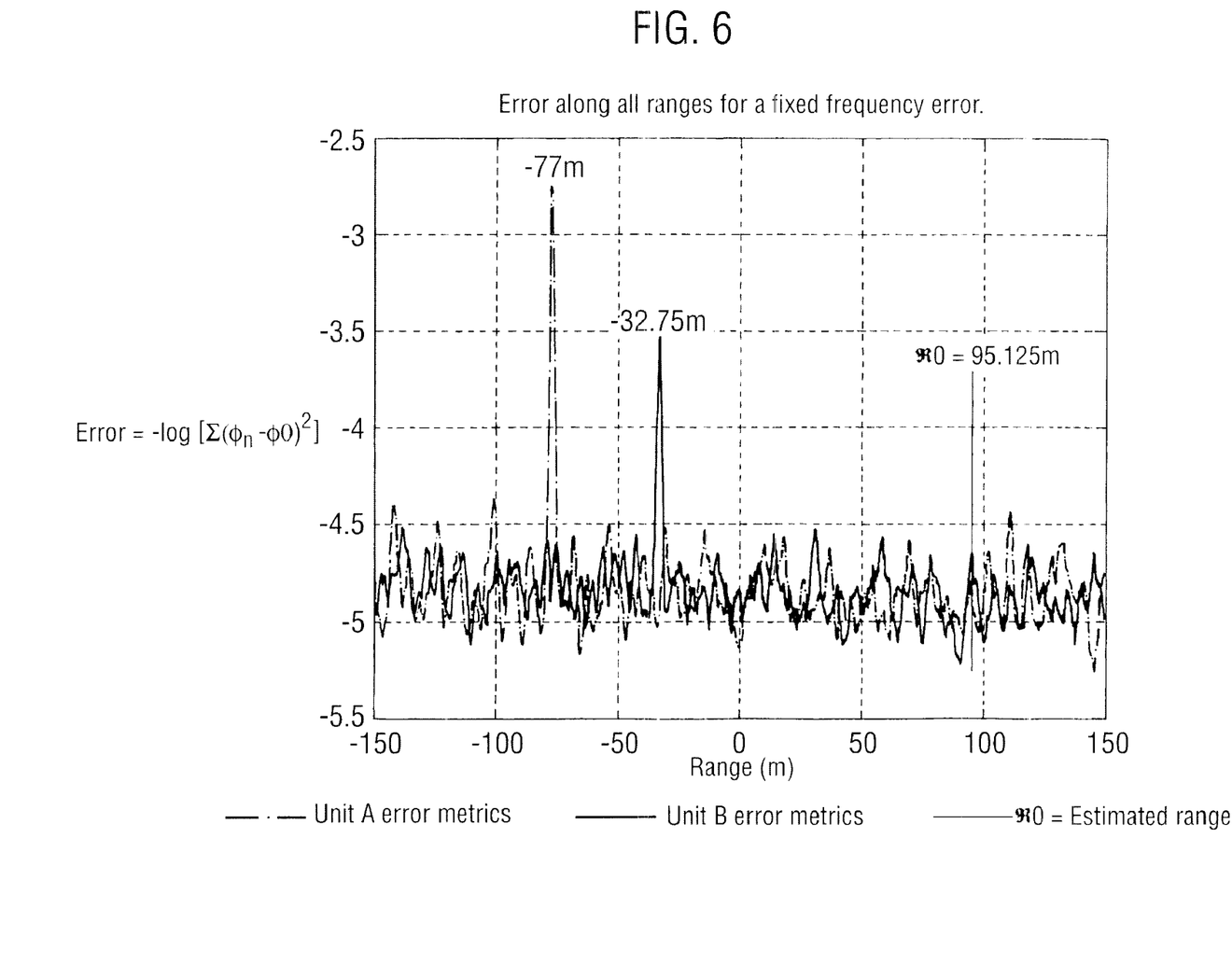
FIG. 6 is a plot of estimated pseudo distance and distance for a simulated system.

FIG. 6 shows the result of a simulation of distance measurement between two units of the type illustrated in FIG. 5. One unit estimates the pseudo distance between the units to be −77 m by making measurements of the signals received from the other of the units. The other of the units estimates the pseudo distance between the units to be −32.75 m by making measurements of the signals received from the first of the units. These estimates are averaged modulo the maximum clock uncertainty in the system to give an estimated distance between the units of 95.125 m. The averaging may be performed in either of the units if it is sent the other's pseudo distance estimate, or in another unit that is sent both pseudo distance estimates.

In another embodiment both the time difference and the phase offset could be guessed, and predictions based on those guesses could be tested against the received signals as described above in order to estimate the correct values.

By applying the methods described above over time, the speed of movement of the receiver relative to the transmitter can also be estimated.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for estimating the distance between a transmitter and a receiver, the transmitter being arranged to transmit a signal as a series of bursts, and the carrier frequency of each burst being set according to a predetermined sequence, the method comprising:
    forming a first series comprising the measured differences between the phases of successive bursts as received at the receiver;
    forming a plurality of second series each comprising estimated differences between the phases of successive bursts as received at a respective supposed time difference between the transmitter and the receiver;
    determining the qualities of fit between the first series and each of the second series; and
    adopting the supposed difference corresponding to the second series having the highest quality of fit to the first series as an estimate of the time difference between the transmitter and the receiver.

2. A method as claimed in claim 1, wherein the supposed time differences from the transmitter span a range between predetermined maximum and minimum distances between the transmitter and the receiver.

3. A method as claimed in claim 2, wherein there are at least 20 second series.

4. A method as claimed in claim 1, wherein the method comprises:
    forming a first one of the second series comprising estimated differences between the phases of successive bursts as received at a current estimate of the time difference between the transmitter and the receiver;
    determining a second estimate of the time difference from the transmitter randomly perturbed from the current estimate of the time difference between the transmitter and the receiver; and
    forming a second one of the second series comprising estimated differences between the phases of successive bursts as received at the second estimate of the time difference between the transmitter and the receiver.

5. A method as claimed in claim 4, wherein the current estimate of the time difference is formed by a method as claimed in claim 2.

6. A method as claimed in claim 1, comprising forming an estimate of the probability that the time difference between the transmitter and the receiver will have each of a plurality of values, weighting the quality of fit between the first series and at least some of the second series in accordance with the estimated probability corresponding to the time difference corresponding to the respective second estimate, and comparing the weighted qualities of fit.

7. A method as claimed in claim 1, wherein the step of forming the first series comprises processing the signal received at the receiver to mix down the final intermediate receiver frequency to zero.

8. A method as claimed in claim 7, wherein the step of forming the first series comprises processing the signal received at the receiver to mix down the final intermediate receiver frequency to zero from a final non-zero intermediate receiver frequency.

9. A method as claimed in claim 7, wherein the mixing down of the final intermediate receiver frequency is performed digitally.

10. A method as claimed in claim 1, wherein the measured differences between the phases of successive bursts are determined based on the phases of the bursts as measured at the end of each burst.

11. A method as claimed in claim 1, wherein the transmitter and the receiver are operable according to a frequency hopping spread-spectrum scheme.

12. A method as claimed in claim 10 wherein the scheme is Bluetooth.

13. A method as claimed in claim 1, wherein the transmitted signal is modulated with data to be transmitted from the transmitter to the receiver.

14. A receiver arranged to perform a method according claim 1.

* * * * *